(12) United States Patent
Barnes et al.

(10) Patent No.: US 12,439,327 B2
(45) Date of Patent: Oct. 7, 2025

(54) REBOOT TIME METRIC DETERMINATION FOR ACCESS POINTS

(71) Applicant: ITRON, INC., Liberty Lake, WA (US)

(72) Inventors: Keith Wayne Barnes, Waseca, MN (US); Thomas F. Uhling, Spokane Valley, WA (US)

(73) Assignee: ITRON, INC., Liberty Lake, WA (US)

( * ) Notice: Subject to any disclaimer, the term of this patent is extended or adjusted under 35 U.S.C. 154(b) by 373 days.

(21) Appl. No.: 18/084,333

(22) Filed: Dec. 19, 2022

(65) Prior Publication Data

US 2024/0205799 A1    Jun. 20, 2024

(51) Int. Cl.
*H04B 7/00*     (2006.01)
*H04W 48/16*    (2009.01)
*H04W 88/08*    (2009.01)

(52) U.S. Cl.
CPC .......... *H04W 48/16* (2013.01); *H04W 88/08* (2013.01)

(58) Field of Classification Search
CPC .................................................... H04W 48/16
USPC ........................................................ 370/310
See application file for complete search history.

(56) References Cited

U.S. PATENT DOCUMENTS

| 10,694,555 | B2 * | 6/2020 | Zhang .................. H04L 61/5092 |
| 2010/0202362 | A1 * | 8/2010 | Harikumar ............ H04L 67/142 |
| | | | 709/227 |
| 2019/0174389 | A1 | 6/2019 | Kamp et al. |
| 2021/0288873 | A1 | 9/2021 | Lee et al. |
| 2023/0046129 | A1 | 2/2023 | Uhling et al. |
| 2025/0096967 | A1 | 3/2025 | Omer et al. |

OTHER PUBLICATIONS

U.S. Appl. No. 17/402,211, titled "Determining Network Reliability Using Message Success Rates," filed Aug. 13, 2021, 101 pages.
Non Final Office Action received for U.S. Appl. No. 18/084,312 dated Jun. 4, 2025, 39 pages.

* cited by examiner

*Primary Examiner* — Temica M Beamer
(74) *Attorney, Agent, or Firm* — Artegis Law Group, LLP

(57) ABSTRACT

Various embodiments set forth a method comprising detecting, by an access point, that the access point has obtained network connectivity after a first reboot event; in response to detecting that the access point has obtained network connectivity after the first reboot event: determining, by the access point, a first amount of time between a first reboot time associated with the first reboot event and a second reboot time associated with a second reboot event that occurred prior to the first reboot event; updating, by the access point, a reboot time metric associated with the access point based on the first amount of time; and transmitting, by the access point, the reboot time metric to one or more nodes of a mesh network.

20 Claims, 9 Drawing Sheets

REBOOT TIME METRIC DETERMINATION FOR ACCESS POINTS

BACKGROUND

Field of the Various Embodiments

Various embodiments of the present disclosure relate generally to wireless networks and, more specifically, to reboot metric determination for access points.

Description of the Related Art

In mesh networks, one or more nodes communicate using one more communication media, such as various wired connections (e.g., Ethernet, power line communication (PLC), or the like) and/or wireless connections (e.g., WiFi®, Bluetooth®, radiofrequency (RF) communication, or the like). Many such mesh networks are self-organized as peer-to-peer networks, in which connections are established in response to the nodes discovering one another rather than based on a predefined topology or a centralized server. In addition, the mesh network can include access points that provide access from the mesh network to devices and networks outside of the mesh network.

BRIEF DESCRIPTION OF THE DRAWINGS

So that the manner in which the features of the various embodiments can be understood in detail, a description of the inventive concepts may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
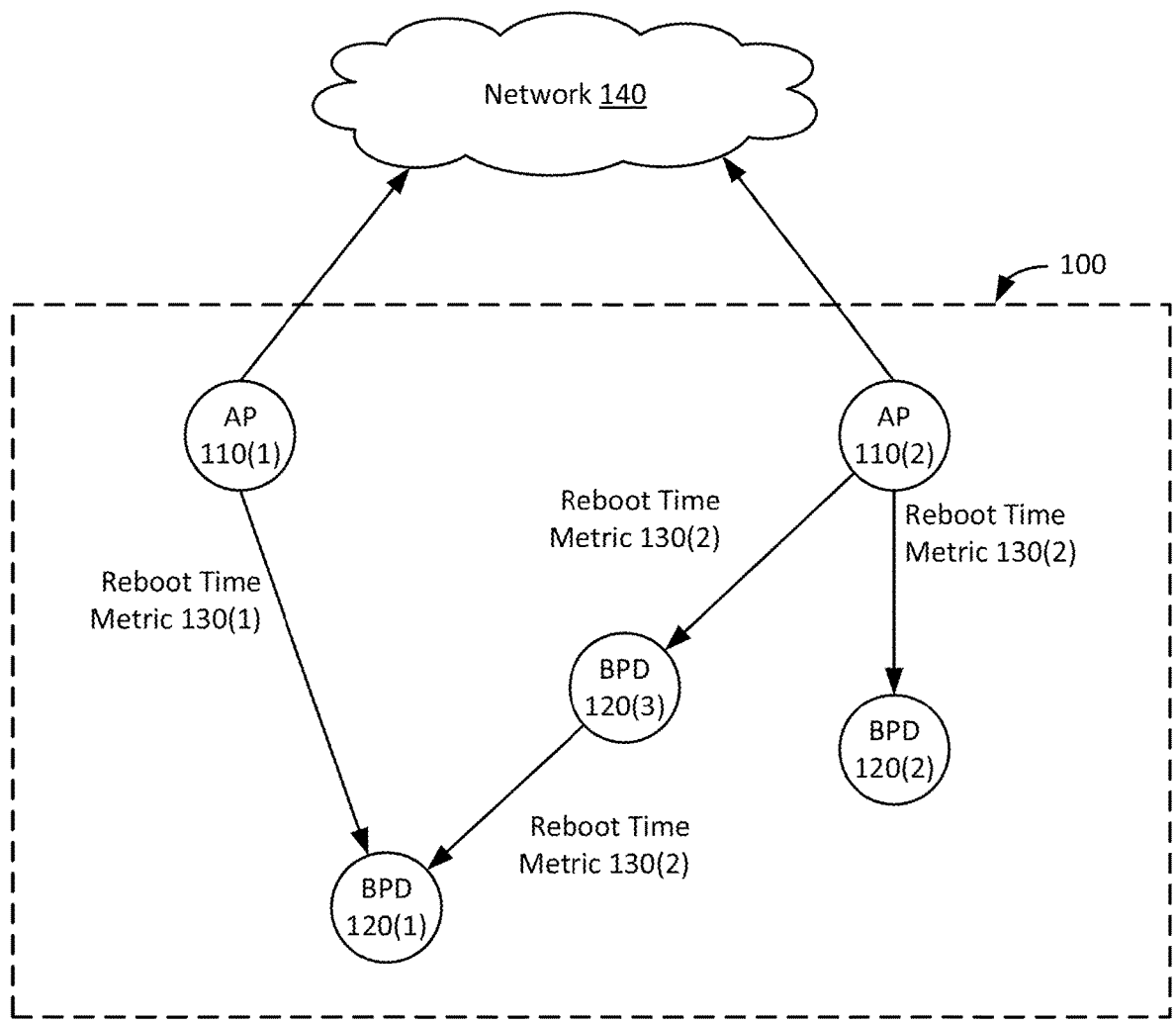
FIG. 1 illustrates a block diagram of a mesh network, according to various embodiments.

In the following description, numerous specific details are set forth to provide a more thorough understanding of the various embodiments. However, it will be apparent to one of skilled in the art that the inventive concepts may be practiced without one or more of these specific details.

A wireless network can include several different types of nodes that are coupled to one another and configured to wirelessly communicate with one another. Two types of nodes included in many wireless networks are mains-powered device (MPD) nodes and battery-powered device (BPD) nodes. MPD nodes are coupled to mains power, such as a power grid, and have continuous access to power when performing various node activities. BPD nodes are powered with battery cells, such as lithium-ion battery cells, and have to perform node activities using only the limited amount of power available through those battery cells. Additionally, the wireless network can include access points that connect the nodes in the wireless network to other networks. A node selects an access point from different access points that are included in the wireless network, and transmits messages directed towards devices in the other networks via the selected access point.

However, when an access point becomes unavailable (e.g., turns off or reboots), then the nodes that selected the access point for access to another network have to scan for other access points and select a new access point. Accordingly, if a node selects an access point that is frequently unavailable, then the node would have to frequently have a loss of network connectivity and would further have to commit resources to scan for a new access point. Additionally, if the node is a BPD node, scanning for access points and selecting a new access point causes the BPD node to consume more battery power. Having to perform such operations frequently would deplete the limited battery resources available at the node, which reduces the operational life of the BPD node or results in the battery needing premature replacement, which can be time-consuming and expensive.

As discussed below, a solution to the above problems is to have access points maintain a reboot time metric associated. In response to an access point detecting that the access point has rebooted, the access point determines an amount of time between the reboot event and a prior reboot event and updates the reboot time metric based on the amount of time. For example, in various embodiments, the access point maintains and updates a reboot time metric that indicates an average amount of time between reboot events for the access point. Additionally, the access point periodically determines whether the amount of time between the current time and a prior reboot event is greater than the reboot time metric. In response to detecting that the amount of time is greater than the reboot time metric, the access point updates the reboot time metric to reflect that the access point has not rebooted for an extended amount of time. The access point is configured to transmit the reboot time metric to the nodes within the mesh network.

When a node is selecting a parent node, the node receives corresponding reboot time metrics for the access points used by the potential parents. The node selects the parent node from a plurality of potential parent nodes based on the reboot time metrics and/or other quality metrics associated with the corresponding access points. For example, the node can select a first parent node whose access point has a better reboot metric than the access point of a second parent node in order to reduce the frequency with which the node has to expend resources to scan for and select a new parent node.

At least one technical advantage of the disclosed techniques is that the disclosed techniques enable a given node within a mesh network to select parent node based on both the quality of the connection between the node and the parent node as well as the amount of time between reboot events of the access point used by the parent node. With the disclosed techniques, a given node in a mesh network is able to account for frequent reboots when evaluating potential parent nodes. Accordingly, the disclosed techniques, when implemented, reduce power consumption and resource overhead for a given node relative to conventional approaches that do not account for the frequency of reboot events in access points when selecting a parent node.

Parent Node Selection Using Reboot Time Metrics

Referring now to FIG. 1, a block diagram of a mesh network 100 is shown. In various embodiments, mesh network 100 includes, without limitation, access points (AP) 110(1) and AP 110(2) and battery powered devices (BPD) 120(1), BPD 120(2), and BPD 120(3). In various embodiments, devices included in mesh network 100, such as BPDs 120(1), 120(2), and 120(3), communicate with a network 140 that is external to mesh network 100 via APs 110(1) and 110(2). As discussed in further detail below, APs 110(1) and 110(2) generate and maintain reboot time metric 130(1) and 130(2), respectively. A reboot time metric 130 can be any suitable metric or aggregate reboot interval associated with reboot events of an access point, for example and without limitation, the largest interval of time between reboots events across a given number of reboot events, the shortest interval of time between reboot events across a given number of reboot events, an average interval of time between reboot events across a given number of reboot events, an interval of time between the most recent reboot event and the reboot event prior to the most recent reboot event, a number of reboot events that occurred within a given period of time, and/or the like. Although FIG. 1 illustrates each access point 110 having a single reboot time metric, an access point can generate and maintain any number and/or type of reboot time metrics.

As shown in FIG. 1, AP 110(1) and AP 110(2) transmit reboot time metrics 130(1) and 130(3), respectively, to nearby nodes 120(2) and 120(3) in mesh network 100. BPD 120(3) also forwards the reboot time metric 130(2) to the nearby node 120(1) so that node 120(1) knows the reboot time metric 130(2) of access point 110(2) used by node 120(3). Nodes, such as BPD 120(1), BPD 120(2), and BPD 120(3), select a parent node and correspondingly an access point for communicating with network 140 based on the reboot time metrics received from different access points, such as AP 110(1) and AP 110(2).

In some embodiments, the nodes to which a given AP 110 transmits a reboot time metric depends on the nodes with which the given AP 110 is able to communicate (e.g., depending on the range of the given AP 110). As shown in FIG. 1, access point 110(1) transmits reboot time metric 130(1) to BPD 120(1) but does not transmit reboot time metric 130(1) to BPD 120(2). Access point 110(2) transmits reboot time metric 130(2) to both BPD 120(2) and BPD 120(3), but not BPD 120(1).

Figure 2:
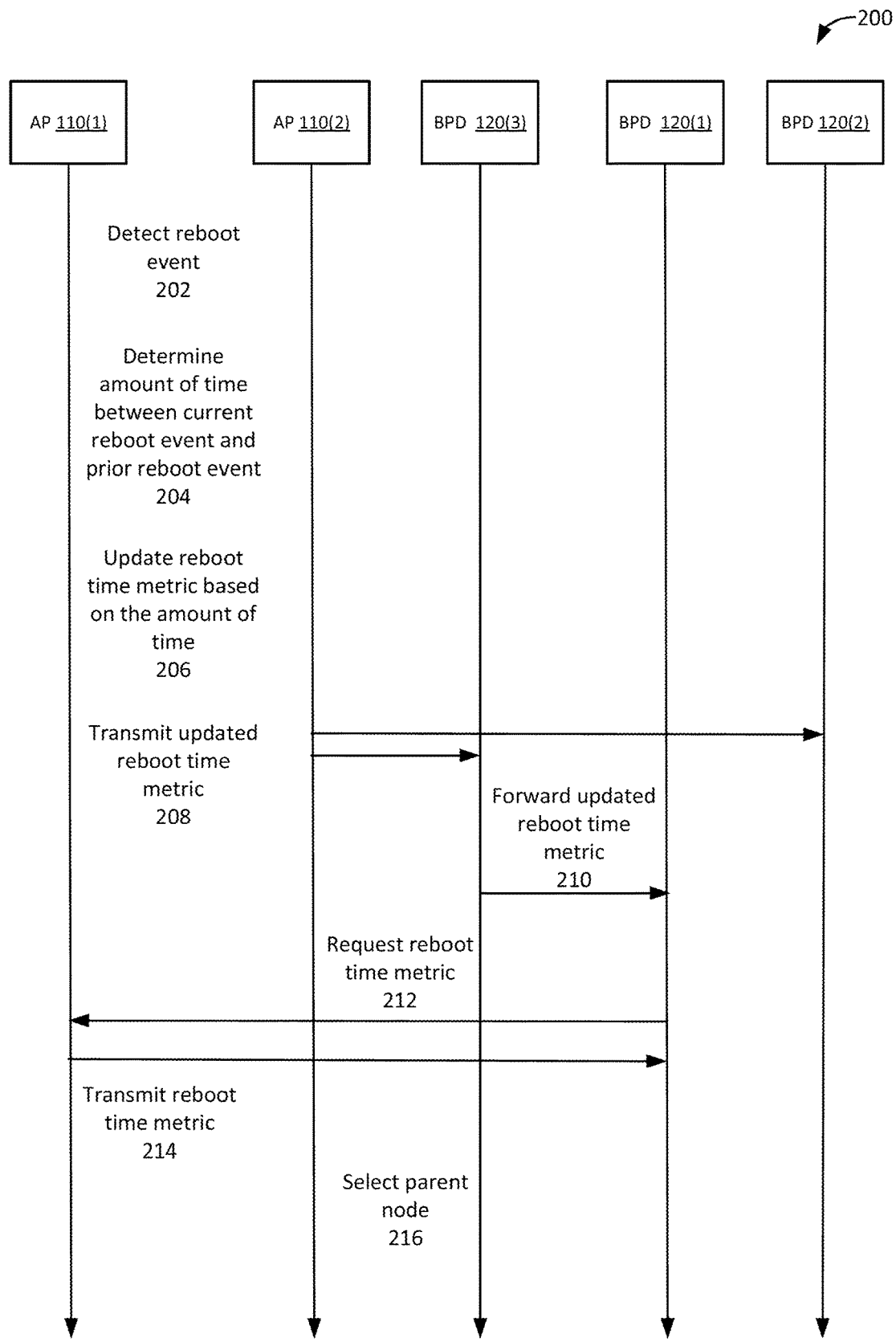
FIG. 2 illustrates an example sequence diagram showing a process for an access point in a mesh network to update a reboot time metric and a BPD node to select a parent node based on the reboot time metric, according to various embodiments.

FIG. 2 illustrates an example sequence diagram showing a process 200 for an access point in a mesh network to update a reboot time metric and a BPD node to select a parent node based on the reboot time metric. Although the interactions between the three BPD nodes and the two access points are shown in an order, persons skilled in the art will understand that the interactions can be performed in a different order, interactions can be repeated or skipped, and/or can be performed by components other than those described above in FIG. 1.

As shown in FIG. 2, AP 110(1), AP 110(2), BPD 120(1), BPD 120(2), and BPD 120(3) of a mesh network are connected by communication medium (not shown). The communication medium can be, for example, a wired connection (e.g., an Ethernet connection or a power line communication connection) or a wireless connection (e.g., a Wi-Fi connection or a Bluetooth connection). Although not shown, AP 110(1), AP 110(2), BPD 120(1), BPD 120(2), and BPD 120(3) can be in communication with other nodes of the mesh network by the same communication medium or different communication media. Both AP 110(1) and AP 110(2) are configured to execute instructions that enable AP 110(1) and AP 110(2) to (without limitation) detect reboot events, update reboot time metrics, and transmit reboot time metrics to other nodes in the mesh network. Also, BPD 120(1), BPD 120(2), BPD 120(3) are configured to execute instructions that enable BPD 120(1), BPD 120(2), and BPD 120(3) to select a parent node for transmitting messages to an external network based on reboot time metrics of access points, such as AP 110(1) and/or AP 110(2).

In some embodiments, AP 110(1) and AP 110(2) store data associated with reboot time metrics in persistent storage included in and/or accessible to AP 110(1) and AP 110(2), respectively. The data could include, for example, one or more reboot time metrics, a timestamp associated with a prior reboot event, parameters (e.g., threshold values, default values, and/or the like) associated with determining and/or updating a reboot time metric, data indicating whether a reboot occurred that did not cause the reboot time metric to be updated (e.g., a reboot where the amount of time since the last reboot does not exceed a threshold amount of time), and/or the like. Storing the data associated with the reboot time metrics in persistent storage enables the AP 110(1) and AP 110(2) to retrieve the data after a reboot event.

As shown, process 200 begins at step 202, in which AP 110(2) detects that a reboot event occurred at AP 110(2). In some embodiments, AP 110(2) detects that a reboot event occurred after powering on from a powered off state. In some embodiments, AP 110(2) detects that a reboot event occurred after reconnecting to a network, such as network 140, after being disconnected from the network 140.

At step 204, AP 110(2) determines an amount of time between the current reboot event and a prior reboot event. In some embodiments, AP 110(2) determines a timestamp associated with the current reboot event and a timestamp associated with the prior reboot event. AP 110(2) subtracts the timestamp associated with the prior reboot event from the timestamp associated with the current reboot event to obtain the amount of time.

At step 206, AP 110(2) updates a reboot time metric based on the amount of time between the current reboot event and the prior reboot event. Generally, AP 110(2) can use any suitable method to adjust the reboot time metric depending on the type of metric represented by the reboot time metric. In some embodiments, the reboot time metric represents an average time between reboot events. In such embodiments, AP 110(2) adjusts the average based on the amount of time between the current reboot event and the prior reboot event.

At step 208, AP 110(2) transmits the updated reboot time metric to BPD 120(2) and BPD 120(3). In some embodiments, AP 110(2) transmits the updated reboot time metric in response to updating the reboot time metric. In some embodiments, AP 110(2) includes the updated reboot time metric when transmitting a message to BPD 120(2) and BPD 120(3).

At step 210, BPD 120(3) forwards the updated reboot time metric of AP 110(2) to BPD 120(1).

At step 212, BPD 120(1) requests a reboot time metric from AP 110(1). In some embodiments, BPD 120(1) transmits or broadcasts a discovery message to nearby nodes as part of a neighbor discovery process. In some embodiments, BPD 120(1) transmits a request to one or more discovered nearby nodes to obtain information about those nearby nodes. The requested information includes a reboot time metric for an access point used by the nearby node, or for quality metrics including the reboot time metric. For example, BPD 120(1) could transmit a request for quality metrics to each discovered neighbor node. As shown in the embodiments of FIG. 2, the nearby node is access point 110(1), which will provide the reboot time metric for access point 110(1). However in other embodiments, the nearby node is another BPD 120, which will provide the reboot time metric for the access point used by the another BPD 120. In other embodiments, BPD 120(1) could identify one or more access points from a set of discovered nearby nodes and transmit a request for a reboot time metric to each identified access point (e.g., AP 110(1) and AP 110(2)).

At step 214, in response to receiving the request for a reboot time metric from BPD 120(1), AP 110(1) transmits a reboot time metric to BPD 120(1). In some embodiments, AP 110(1) transmits a plurality of quality metrics associated with AP 110(1) to BPD 120(1), where the plurality of quality metrics includes the reboot time metric. The plurality of quality metrics could include, for example, one or more of a reboot time metric, message success rate, access point loading percentage, number of connected devices, connection type, connection quality metric (e.g., RSSI, latency, hop count), and/or the like.

At step 216, BPD 120(1) selects a parent node from one or more potential parent nodes based on the reboot time metrics for the access points used by those potential parent node(s). In some embodiments, BPD 120(1) also determines a message success rate associated with each potential parent node. The message success rate indicates a likelihood of successfully transmitting messages to a target destination via the potential parent node and/or receiving messages from the target destination via the potential parent node. In such embodiments, selecting a parent node is further based on the message success rate. For example, BPD 120(1) could select the parent node with a highest message success rate and whose access point is associated with the highest reboot time message.

Figure 3:
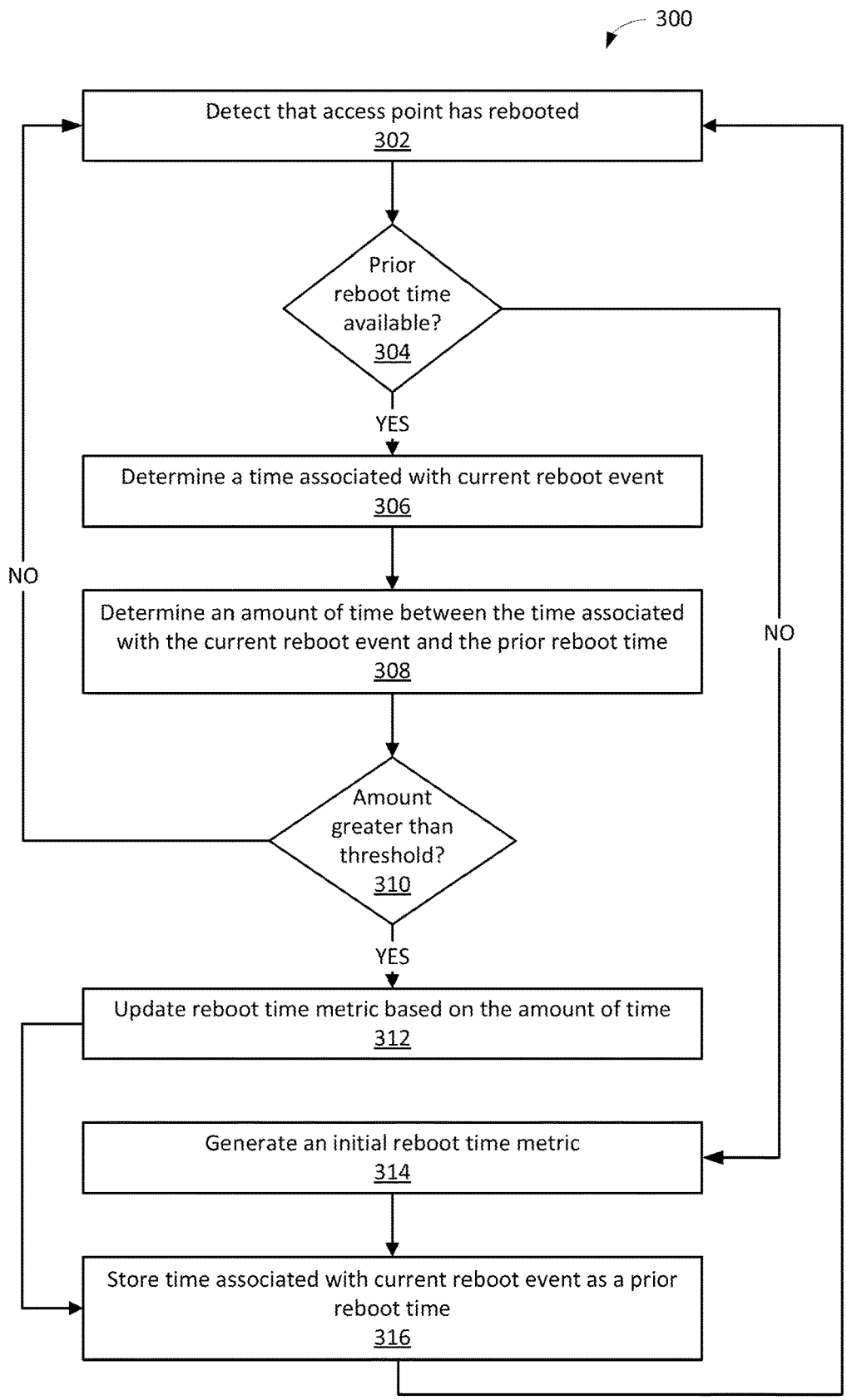
FIG. 3 illustrates a flow diagram of method steps for updating a reboot time metric at an access point after a reboot event, according to various embodiments.

FIG. 3 illustrates a flow diagram of method steps for updating a reboot time metric at an access point after a reboot event, according to various embodiments. The method steps of FIG. 3 can be performed, for example, by access points 110(1) or 110(2) of FIGS. 1 and 2. At least some of the method steps of FIG. 3 can be performed, for example, when performing the processes 202-208 of FIG. 2.

As shown, a method 300 begins at step 302, in which an access point detects that the access point has rebooted. In some embodiments, the access point detects that the access point has rebooted after powering on from a powered-off state. In some embodiments, the access point detects that the access point has rebooted after or as part of completing one or more startup operations.

At step 304, the access point determines whether a prior reboot time is available. The prior reboot time is a time associated with the last time that the access point rebooted. In some embodiments, the access point stores the prior reboot time in a persistent storage included in or accessible to the access point. After a reboot event, the access point stores the time associated with the reboot event as the prior reboot time. The access point determines whether a prior reboot time is available by retrieving or reading the prior reboot time from the persistent storage. In some embodiments, the access point determines that the prior reboot time is unavailable if the prior reboot time value has a value that corresponds to a reboot time being unavailable (e.g., zero). In some embodiments, the access point determines that the prior reboot time is unavailable if there is no prior reboot time stored in the persistent storage.

If the prior reboot time is not available (e.g., the access point is starting up for the first time or the timestamp associated with the prior reboot event could not be retrieved from persistent storage), then the method 300 proceeds to step 314, where the access point generates an initial reboot time metric. For example, the access point could be configured to generate a reboot time metric having a default value (e.g., one day, one week, one month, three months, etc.). The method then proceeds to step 316, where the access point stores a time associated with the current reboot event.

If the prior reboot time is available, then the method proceeds to step 306, where the access point determines the time associated with the current reboot event. In some embodiments, the time associated with the current reboot event corresponds to a time when the access point determined that the access point rebooted. In some embodiments, the time associated with the current reboot event corresponds to a time at which the access point first obtains the UTC time after rebooting. For example, the timestamp associated with a current reboot event for AP 110(2) could be the UTC time obtained by AP 110(2) after AP 110(2) connects (or reconnects) to the network 140 after rebooting.

At step 308, the access point determines an amount of time between the time associated with the current reboot event and the prior reboot time. In some embodiments, the access point subtracts the prior reboot time from the timestamp of the current reboot event.

At step 310, the access point determines whether the amount of time between the time associated with the current reboot event and the prior reboot time is greater than a threshold amount. For example, the access point could compare the amount of time with minimum amount of time that should pass between updates to the reboot time metric. In some embodiments, the threshold amount corresponds to the length of time used for a reboot time metric update timer (i.e., the length of time between periodic updates of the reboot time metric).

If the amount of time is less than or equal to the threshold amount, then the access point does not update the reboot time metric. The method 300 returns to step 302 when the access point detects that the access point has rebooted. In some embodiments, the access point also stores data indicating that a reboot event occurred but the reboot time metric was not updated. For example, the access point could set a flag that indicates that a reboot event occurred during the minimum update time period. In some embodiments, the access point stores the time associated with the current reboot event.

As an example, if AP 110(2) shuts down due to a power outage and reboots while power is being restored, AP 110(2) could reboot multiple times during a short period. In such cases, the time between each of the multiple reboots would be less than the threshold amount and the reboot time metric would not be updated for each of the multiple reboots. Instead, the multiple reboots would be treated as a single reboot for the purpose of updating the reboot time metric. In response to determining that the amount of time does not exceed the threshold amount, AP 110(2) would not update the reboot time metric. Additionally, AP 110(2) could set a "reboot under minimum" flag that indicates that a reboot event occurred where the amount of time since the previous reboot was less than the threshold amount.

If the amount of time is greater than the threshold amount, then the method 300 proceeds to step 312, where the access point updates the reboot time metric based on the amount of time. At step 312, AP 110(2) updates the reboot time metric using any suitable approach or algorithm. For example, if the reboot time metric represents an average time between reboot events, AP 110(2) could update the average time between reboot events based on the amount of time determined during step 308. In some examples, updating the average time between reboot events includes determining the difference between the average time and the amount of time and adjusting the average time (e.g., adding to or subtracting from) based on the difference. In some examples, if the reboot time metric represents the shortest amount of time between reboot events across a number of reboot events and/or for a given period of time, AP 110(2) could compare the reboot time metric with the amount of time to determine whether the amount of time is shorter than the amount of time indicated by the reboot time metric. If the amount of time is shorter, then AP 110(2) replaces the reboot time metric with the amount of time. Example functions for updating a reboot time metric are given by equations (1a)-(1d):

$$rebootDiff = rebootTime - lastReboot\ Time \quad (1a)$$

$$\text{if } rebootDiff > \text{max}Diff, \text{ then } rebootDiff = \text{max}Diff \quad (1b)$$

$$rebootTimeMetric = \quad (1c)$$
$$rebootTimeMetric + \left(\frac{rebootDiff - rebootTimeMetric}{rebootWeighingFactor}\right)$$

$$\text{if } rebootTimeMetric > \text{max}Diff, \text{ then } rebootTimeMetric = \text{max}Diff \quad (1d)$$

In equation (1a) and (1b), rebootDiff corresponds to the difference between a time associated with a current reboot event (rebootTime) and a time associated with a prior reboot event (lastRebootTime), and maxDiff corresponds to a maximum amount of time between reboot events. Accordingly, in equations (1a) and (1b), the amount of time between the current reboot event and the prior reboot event is computed by subtracting the timestamp of the prior reboot event from the timestamp of the prior reboot event. Additionally, if the amount exceeds the maximum amount of time between reboot events, the amount is limited to the value of the maximum amount of time between reboot events.

In equation (1c) and (1d), rebootTimeMetric represents an average amount of time between reboot events, and rebootWeighingFactor corresponds to a weighting factor for scaling the difference between the difference (rebootDiff) and the reboot time metric. Accordingly, in equation (1c), the difference between the amount of time between the current event and the prior reboot event and the average amount of time between reboot events is scaled according to a weighting factor. The scaled amount is used to adjust the reboot time metric to generate the updated reboot time metric. In some embodiments, the weighting factor is an exponential weighted moving average (EWMA) weighting factor. Additionally, in equation (1d), if the updated reboot time metric exceeds the maximum amount of time between reboot events (maxDiff), then the updated reboot time metric is limited to the value of the maximum amount of time between reboot events.

At step 316, the access point stores the time associated with the current reboot event as a prior reboot time. The stored timestamp is used as a prior reboot event time when updating the reboot time metric, or determining whether to update the reboot time metric, after a next reboot event. In some embodiments, the access point stores the prior reboot time in a persistent storage that is included in or available to the access point. The method 300 then returns to step 302 for the access point to wait for the next reboot event.

In some embodiments, after updating the reboot time metric, the access point transmits the updated reboot time metric to one or more nodes that are connected to the access point. For example, AP 110(2) could transmit the updated reboot time metric to BPD 120(1) and 120(2). In some embodiments, the access point includes the updated reboot time metric when transmitting a message to a node. As an example, AP 110(2) could be configured to periodically transmit a message indicating quality metrics associated with AP 110(2) to one or more connected neighbor nodes (e.g., nodes that have selected AP 110(2) as an access point). AP 110(2) could include the updated reboot time metric when transmitting the message to the one or more connected neighbor nodes. As another example, AP 110(2) could receive a discovery message broadcast by a nearby node. In response to receiving the discovery message, AP 110(2) could transmit a discovery response message to the nearby node that includes the updated reboot time metric.

In some embodiments, if the access point previously stored data indicating a reboot event occurred but the reboot time metric was not updated, the access point also stores data indicating that the reboot time metric was updated and/or updates or removes the previously stored data after updating the reboot time metric. For example, the access point could clear a previously set flag that indicated that a reboot event occurred during the minimum update time period.

In some embodiments, the access point maintains a reboot time metric update timer for periodically updating the reboot time metric. As described below with respect to FIG. 4, upon expiration of the reboot time metric update timer, if the time since the last reboot event is greater than the reboot time metric, then the access point updates the reboot time metric to account for the increased amount of time since the last reboot event. In such embodiments, after updating the reboot time metric, AP 110(2) starts or resets the reboot time metric update timer.

Figure 4:
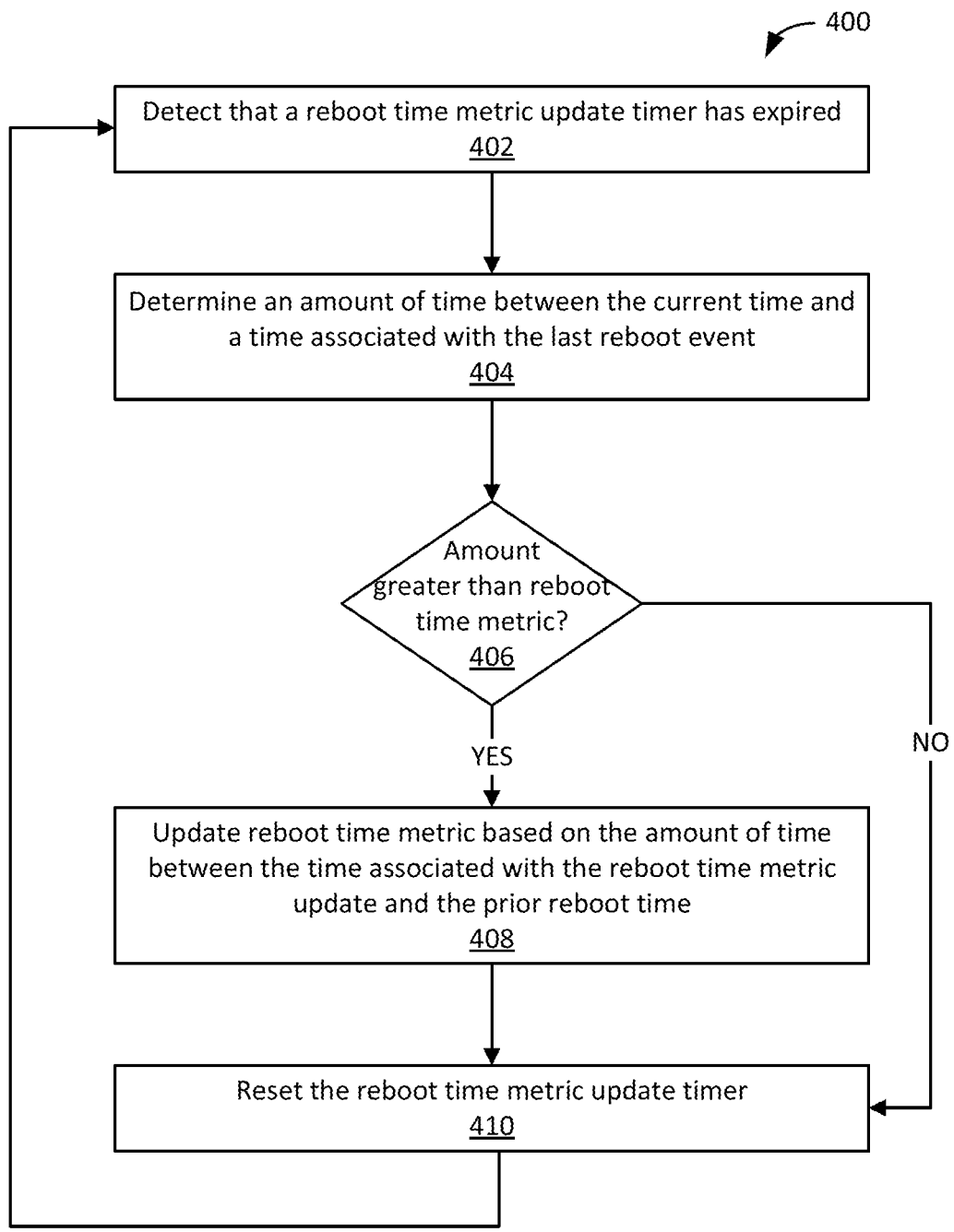
FIG. 4 illustrates a flow diagram of method steps for periodically updating a reboot time metric at an access point, according to various embodiments.

FIG. 4 illustrates a flow diagram of method steps for periodically updating a reboot time metric at an access point, according to various embodiments. The method steps of FIG. 4 can be performed, for example, by access points 110(1) or 110(2) of FIGS. 1 and 2. At least some of the method steps of FIG. 4 can be performed, for example, after performing the processes 202-208 of FIG. 2.

As shown in FIG. 4, a method 400 begins at step 402, where an access point detects that a reboot time metric update timer has expired.

At step 404, the access point determines an amount of time between the current time and a time associated with the last reboot event. In some embodiments, the access point stores a timestamp corresponding to the time associated with the last reboot event in a persistent storage included in or accessible to the access point. The access point reads or retrieves the timestamp and determines a difference between the timestamp and the current time.

In some embodiments, if the amount of time between the current time and the last reboot event is greater than a maximum amount of time between reboot events, then the access point sets the amount of time to the maximum amount of time. Example functions for determining the amount of time between the current time and a prior reboot event time are given by equations (1a) and (1b) discussed above.

At step 406, the access point determines whether the amount of time is greater than the reboot time metric. If the amount of time is less than or equal to the reboot time metric, then the access point does not update the reboot time metric. The method 400 proceeds to step 410 where the access point resets the reboot time metric update timer.

If the amount of time is greater than the reboot time metric, then the method 400 proceeds to step 408, where the access point updates the reboot time metric based on the amount of time between the current time and the time associated with the last reboot event. The access point can update the reboot time metric using any suitable approach or algorithm. For example, if the reboot time metric represents an average time between reboot events, the access point could update the average time between reboot events based on a difference between the average time and the amount of time. Example functions for updating the reboot time metric are given by equations (2a) and (2b):

$$rebootTimeMetric = rebootTimeMetric + \left( \frac{rebootDiff - rebootTimeMetric}{updateWeighingFactor} \right) \quad (2a)$$

if $rebootTimeMetric > \max Diff$, then $rebootTimeMetric = \max Diff$ (2b)

In equation (2a) and (2b), rebootTimeMetric represents an average amount of time between reboot events, and updateWeighingFactor corresponds to a weighting factor for scaling the difference between the difference (rebootDiff) and the reboot time metric when performing a periodic update. Accordingly, in equation (2a), the difference between the amount of time between the current event and the prior reboot event and the average amount of time between reboot events is scaled according to a weighting factor. The scaled amount is used to adjust the reboot time metric to generate the updated reboot time metric. In some embodiments, the weighting factor is an exponential weighted moving average (EWMA) weighting factor. In some embodiments, the weighting factor used for periodic updates to the reboot time metric is different from the weighting factor used for updating the reboot time metric after a reboot event. Additionally, in equation (2b), if the updated reboot time metric exceeds the maximum amount of time between reboot events (maxDiff), then the updated reboot time metric is limited to the value of the maximum amount of time between reboot events.

At step 410, the access point resets the reboot time metric update timer. The method then returns to step 402 where the access point waits for the reboot time metric update timer to expire.

In some embodiments, after detecting that the reboot time metric update timer has expired at step 402, the access point determines whether a reboot event occurred where the reboot time metric was not updated. For example, the access point could determine whether a flag that indicates that a reboot event occurred during the minimum update time period is set or not. In such embodiments, if the access point determines that a reboot event occurred where the reboot time metric was not updated, the access point proceeds directly to step 408 where the access point updates the reboot time metric. In some embodiments, the access point updates the reboot time metric using the same approach as updating the reboot time metric after a reboot event, instead of using the approach for a periodic update. For example, the access point could use a weighting factor associated with reboot events instead of a weighting factor associated with periodic updates.

Figure 5:
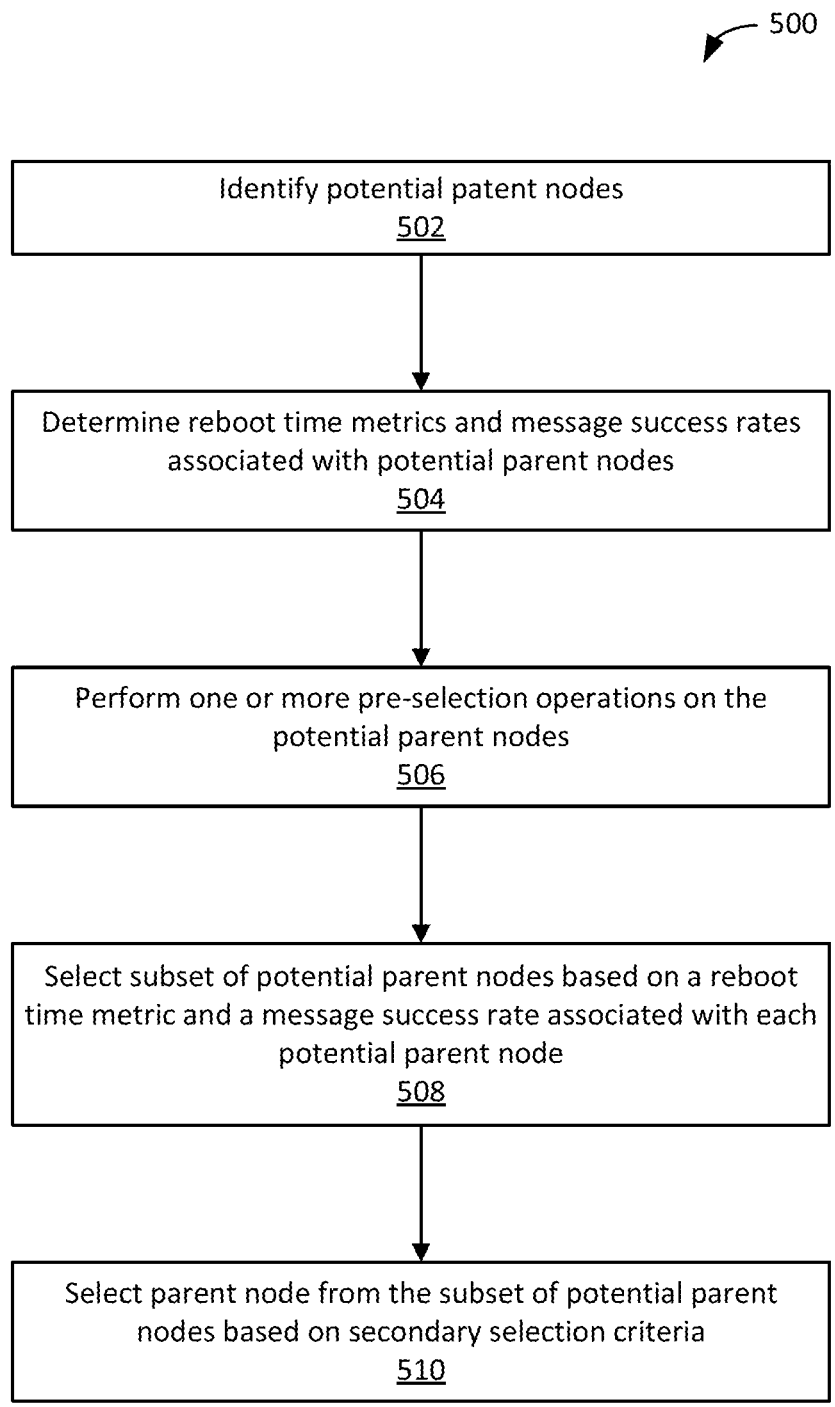
FIG. 5 illustrates a flow diagram of method steps for selecting a parent node based on reboot time metrics of access points, according to various embodiments.

FIG. 5 illustrates a flow diagram of method steps for selecting a parent node based on reboot time metrics of access points, according to various embodiments. The method steps of FIG. 5 can be performed, for example, by BPDs 120(1), 120(2), and 120(3) of FIGS. 1 and 2. At least some of the method steps of FIG. 5 can be performed, for example, when performing the step 216 of FIG. 2.

As shown, a method 500 begins at step 502, where a node (e.g., BPD node 120(1), BPD node 120(2), or BPD node 120(3)), identifies a set of one or more potential (or candidate) parent nodes. In some embodiments, the one or more potential parent nodes could one or more BPDs 120 and/or one or more access points 110. In some embodiments, the node identifies the set of potential parent nodes by scanning for nearby nodes. For example, the node could perform one or more discovery operations to discover a plurality of nearby nodes.

At step 504, the node determines and reboot time metrics and message success rates associated with the set of potential parent nodes of access points. In cases where a potential parent node is an access point, the reboot time metric associated with that potential parent node is the reboot time metric of that potential parent node/access point. In cases where a potential parent node is not an access point, the reboot time metric associated with that potential parent node is a reboot time metric of the access point used by that potential parent node. In some embodiments, the node transmits a request for a reboot time metric, or for quality metrics (e.g. as part of a discovery process) including the reboot time metric, to the set of potential parent nodes. In response, the node receives one or more reboot time metrics and/or one or more quality metrics from each potential parent node. The quality metrics received from a given potential parent node could include, for example, one or more of message success rate, access point loading percentage, number of connected devices, connection type, connection quality metric (e.g., RSSI, latency, hop count), and/or the like.

In some embodiments, the node determines one or more message success rates associated with the communications link to a potential parent node or associated access point, such as one or more of an uplink message success rate, a downlink message success rate, or a combined message success rate. The uplink message success rate indicates a likelihood that a message transmitted from the node to a target destination via the potential parent node and associated access point will be successfully received by the target destination. The downlink message success rate indicates a likelihood that a message transmitted to the node from the target destination via the potential parent node and associated access point will be successfully received by the node. The combined message success rate is a combination of the uplink message success rate and the downlink message success rate. Example techniques for determining message success rates can be found in U.S. patent application Ser. No. 17/402,211, titled "DETERMINING NETWORK RELIABILITY USING MESSAGE SUCCESS RATES," filed Aug. 13, 2021, the contents of which are incorporated by reference herein.

At step 506, the node performs one or more pre-selection operations on the set of potential parent nodes. In some embodiments, performing the one or more pre-selection operations includes generating and populating a potential parent node table with the one or more potential parent nodes. An entry is created in the table for each potential parent node. The entries includes information associated with the corresponding potential parent node, such as nodes characteristics (e.g., connection type, node or device type, and/or the like), reboot time metric(s), message success rate(s), other access point quality metrics, and/or the like.

In some embodiments, performing the one or more pre-selection operations includes applying one or more pre-selection criteria to filter the set of potential parent nodes. Any suitable criteria could be applied to filter the set of potential parent nodes.

In some embodiments, if only a single potential parent node was identified at step 502 or a single potential parent node is remaining after performing the one or more pre-selection operations, then the node selects the potential parent node as the parent node for the node.

At step 508, the node selects a subset of potential parent nodes from the set of potential parent nodes. In some embodiments, the node selects a subset of potential parent nodes from the set of potential parent nodes based on a reboot time metric and a message success rate associated with each potential parent nodes. Selecting a subset of potential parent nodes is performed in a manner similar to that described above with respect to step 216 of process 200 and in FIG. 6 below.

In some embodiments, the node selects a subset of potential parent nodes based on a hierarchical set of criteria associated with the message success rate and reboot time metric associated with each potential parent node. The node evaluates the set of potential parent nodes using the first (highest) criteria in the hierarchy. If any potential parent nodes satisfy the first criteria, then the node selects the potential parent nodes that satisfy the first criteria as the subset of potential access points. If no potential parent nodes satisfy the first criteria, then the node evaluates the set of potential parent nodes using the second (next highest) criteria in the hierarchy. If any potential parent nodes satisfy the second criteria, then the node selects the potential parent nodes that satisfy the second criteria as the subset of potential parent nodes. If no potential parent nodes satisfy the second criteria, and a third criteria is available, then the node proceeds to the third criteria. The process repeats until a subset has been identified or the node determines that no further criteria are available. In some embodiments, if the potential parent nodes in the set of potential parent nodes does not satisfy any criteria in the set of criteria, the node selects all of the potential parent nodes included in the set of potential parent nodes.

At step 510, the node selects a parent node from the subset of potential parent nodes based on secondary selection criteria. Selecting an access point from the subset of potential access points is performed in a manner similar to that described above with respect to step 216 of process 200 and in FIG. 6 below.

In some embodiments, if the subset of potential parent nodes includes a single potential parent node, then the node selects the potential parent node as the parent node for the node without evaluating any secondary selection criteria.

In some embodiments, the secondary selection criteria varies based on the selection criteria that was satisfied by the subset of potential parent nodes. Referring to the above example, the first selection criteria could be associated with a first set of secondary selection criteria, the second selection criteria could be associated with a second set of secondary selection criteria, and so forth. If the subset of potential parent nodes satisfy the first selection criteria, then the node selects a parent node from the subset of potential parent nodes using the first set of secondary selection criteria. In some embodiments, one or more of the selection criteria can be associated with no secondary selection criteria. In such embodiments, if the subset of potential access points satisfy a selection criteria that is not associated with secondary selection criteria, then an access point is randomly selected from the subset of potential parent nodes.

In some embodiments, one or more sets of secondary selection criteria are a hierarchical set of criteria. The node evaluates the subset of potential parent nodes against the secondary selection criteria in accordance with the hierarchy. In some embodiments, the node iteratively filters the subset of potential parent nodes based on each successive criteria in the hierarchy until a single potential parent node is identified. In some embodiments, the node determines whether any potential parent nodes included in the subset of potential parent nodes meets the next secondary selection criteria in the hierarchy. If one or more potential parent nodes meets the next secondary selection criteria, then the node selects the parent node from the one or more potential parent nodes that meet the next secondary selection criteria. In some embodiments, one or more of the secondary selection criteria are further associated with a corresponding approach (e.g., criteria, algorithm, random selection, and/or the like) for selecting a parent node from potential parent nodes that meet the secondary criteria.

Figure 6:
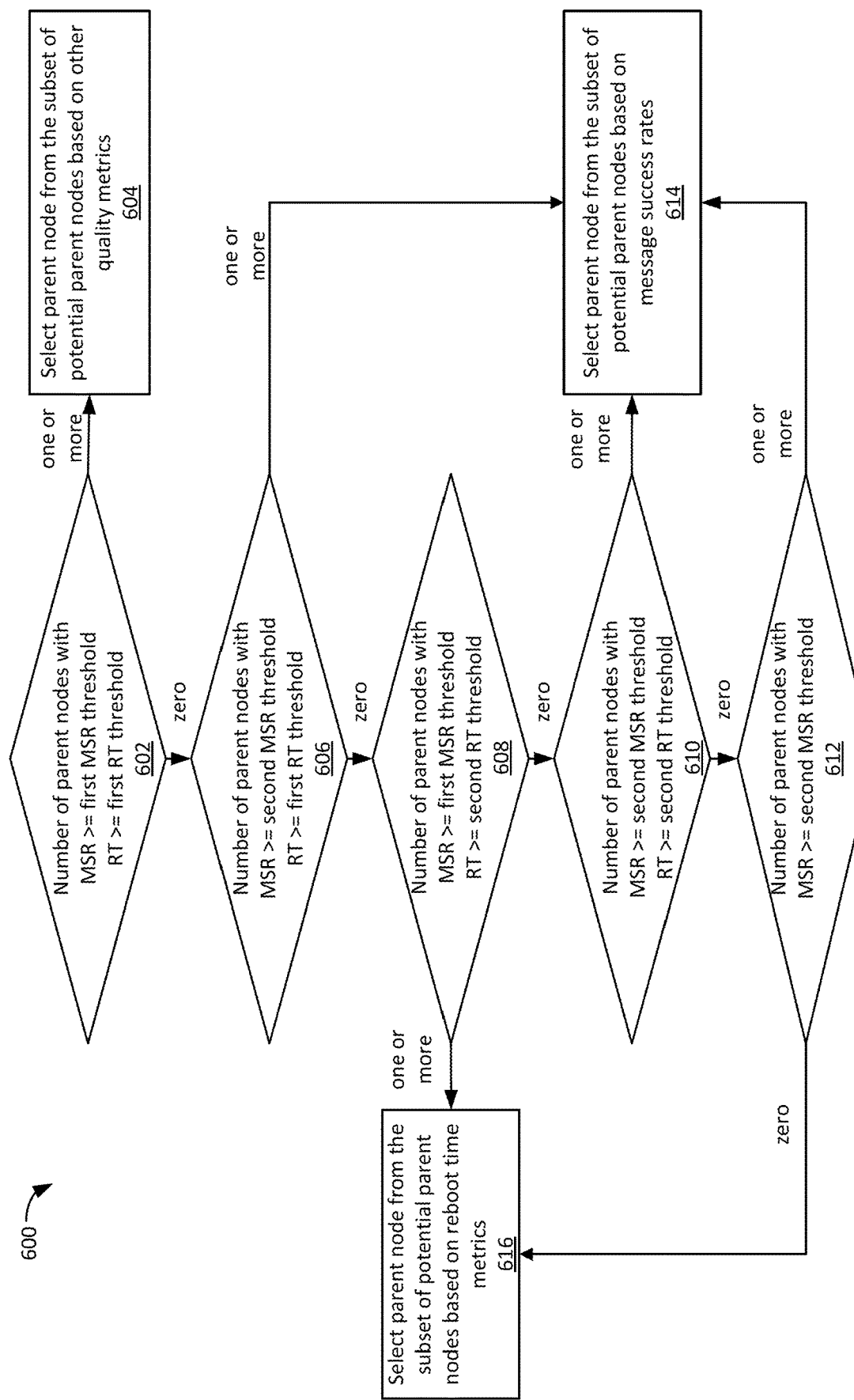
FIG. 6 illustrates a flow diagram of method steps for selecting a subset of potential parent nodes and selecting a parent node included in the subset of potential parent nodes based on secondary selection criteria, according to various embodiments.

FIG. 6 illustrates a flow diagram of method steps for selecting a subset of potential parent nodes and selecting a parent node included in the subset of potential parent nodes based on secondary selection criteria, according to various embodiments. The method steps of FIG. 6 can be performed, for example, by BPDs 120(1) and 120(2) of FIGS. 1 and 2. At least some of the method steps of FIG. 6 can be performed, for example, when performing the step 216 of FIG. 2.

In various embodiments, the method steps of FIG. 6 are performed when performing steps 508 and 510 of FIG. 5. As shown below, when performing the method 600, a node compares the message success rates and reboot time metrics associated with a set of potential parent nodes against successive primary selection criteria to select a subset of potential parent nodes. The node selects a parent node from the subset of potential parent nodes using different secondary selection criteria that are based on the specific primary selection criteria that was used to select the subset of potential parent nodes.

As shown, the method 600 begins at step 602, where a node determines a number of potential parent nodes included in a set of potential parent nodes with an associated message success rate (MSR) greater than or equal to a first MSR threshold and an associated reboot time metric (RT) greater than or equal to a first RT threshold. In some embodiments, the first MSR threshold corresponds to a preferred message success rate and the first RT threshold corresponds to a preferred reboot time metric.

If one or more potential parent nodes meet the criteria specified at step 602, then the method proceeds to step 604 with the subset of potential parent nodes that meet the specified criteria. At step 604, the node selects a parent node from the subset of potential parent nodes based on other quality metrics associated with the subset of potential parent nodes. The quality metrics include, for example and without limitation, access point loading percentage, parent node loading percentage, number of connected devices, connection type, connection quality metric (e.g., RSSI, latency, hop count), and/or the like.

In some embodiments, the node selects a parent node based on a hierarchical set of selection criteria associated with one or more quality metrics. As an example, the set of selection criteria could include a first criteria that determines whether any potential parent nodes have a loading percentage below a threshold amount (e.g., a load balancing threshold); a second criteria that determines whether any potential parent nodes are associated with a given connection type; a third criteria that determines the potential parent nodes associated with the given connection type that have the lowest loading percentage; a fourth criteria that determines the potential parent nodes associated with the lowest latency; and so on. For any given criteria, the node could proceed to another criteria in the hierarchy with potential parent nodes that meet the given criteria, randomly select a parent node from the potential parent nodes that meet the given criteria or select a parent node that best meets the given criteria (e.g., lowest latency, lowest loading percentage, highest connection quality, and so on). The approach used for selecting a parent node from potential parent nodes that meet a secondary criteria can be different for each secondary criteria.

If no potential parent nodes meet the criteria specified at step 602, then the method proceeds to step 606. At step 606, the node determines a number of potential parent nodes included in the set of potential access points with an associated MSR greater than or equal to a second MSR threshold and an associated RT greater than or equal to the first RT threshold. In some embodiments, the second MSR threshold corresponds to a minimum acceptable message success rate. In some embodiments, the second MSR threshold corresponds to a margin amount below the first MSR threshold.

If one or more potential parent nodes meet the criteria specified at step 606, then the method proceeds to step 614 with the subset of potential parent nodes that meet the specified criteria. At step 614, the node selects a parent node from the subset of potential parent nodes based on message success rates associated with the subset of potential parent nodes. In some embodiments, the node selects the parent node that is associated with the highest message success rate. In some embodiments, if multiple parent nodes are associated with the highest message success rate, then the node randomly selects one of the parent nodes associated with the highest message success rate. In some embodiments, if multiple parent nodes are associated with the highest message success rate, then the node selects one of the parent nodes associated with the highest message success rate based on other quality metrics (e.g., using the secondary criteria discussed above for step 604).

If no potential parent nodes meet the criteria specified at step 606, then the method proceeds to step 608. At step 608, the node determines a number of potential parent nodes with an associated MSR greater than or equal to the first MSR threshold and an associated RT greater than or equal to a second RT threshold. In some embodiments, the second RT threshold corresponds to a minimum acceptable reboot time metric. In some embodiments, the second RT threshold corresponds to a margin amount below the first RT threshold.

If one or more potential parent nodes meet the criteria specified at step 606, then the method proceeds to step 616 with the subset of potential parent nodes that meet the specified criteria. At step 616, the node selects a parent node from the subset of potential parent nodes based on reboot time metrics associated with the subset of potential parent nodes. In some embodiments, the node selects the parent node that is associated with the highest reboot time metric. In some embodiments, if parent nodes are associated with the highest reboot time metric, then the node randomly selects one of the parent nodes associated with the highest reboot time metric. In some embodiments, if multiple parent nodes are associated with the highest reboot time metric, then the node selects one of the parent nodes associated with the highest reboot time metric based on other quality metrics (e.g., using the secondary criteria discussed above for step 604).

If no potential parent nodes meet the criteria specified at step 608, then the method proceeds to step 610. At step 610, the node determines a number of potential parent nodes with an associated MSR greater than, or equal to, the second MSR threshold and an associated RT greater than, or equal to, the second RT threshold.

If one or more potential parent nodes meet the criteria specified at step 610, then the method proceeds to step 614 with the subset of potential parent nodes that meet the specified criteria, where the node selects a parent node from the subset of potential parent nodes based on message success rates associated with the subset of potential parent nodes.

If no potential parent nodes meet the criteria specified at step 610, then the method proceeds to step 612. At step 612, the node determines a number of potential parent nodes with an associated MSR greater than, or equal to, the second MSR threshold.

If one or more potential parent nodes meet the criteria specified at step 612, then the method proceeds to step 614 with the subset of potential parent nodes that meet the specified criteria, where the node selects a parent node from the subset of potential parent nodes based on message success rates associated with the subset of potential parent nodes.

If no potential parent nodes meet the criteria specified at step 612, then the method proceeds to step 616 with the set of potential parent nodes, where the node selects a parent node from the set of potential parent nodes based on reboot time metrics associated with the set of potential parent nodes. That is, if the node determines that no potential parent node meets any of the criteria specified in steps 602-610, then the node selects a parent node associated with the best (e.g., highest) reboot time metric.

One advantage of selecting a parent node based on hierarchical selection criteria is that a node, such as BPD 120(1) selects a parent node that meets the most important criteria (e.g., has the highest value for the most important metric(s)), the node is able to select the parent node without accounting for less important metric(s). In contrast, using approaches that account for multiple metrics at the same time (e.g., sum or weighted sum) can cause a node to select a parent node that does not necessarily meet the most important criteria but meets or exceeds the less important criteria.

For example, assume a first potential parent node is associated with a first reboot time metric and a first set of secondary quality metrics and a second potential parent node is associated with a second reboot time metric that is lower than the first reboot time metric and a second set of secondary quality metrics that are higher than the first set of secondary quality metrics. If BPD 120(1) computed a weighted sum based on the reboot time metric and secondary quality metrics, the weighted sum for the second potential parent node could be greater than the weighted sum for the first potential parent node, causing BPD 120(1) to select the second potential parent node. However, using the disclosed techniques, BPD 120(1) could prioritize the reboot time metric and select the first access point based on the first reboot time metric being greater than the second reboot time metric.

Although examples are described above with respect to a BPD selecting a parent node based on reboot time metrics, the disclosed techniques can be used by any type of node to select any other type of node for transmitting messages within a network. In some embodiments, if nodes in a mesh network are arranged in a hierarchical structure, a node selects a parent node from a plurality of potential parent nodes based on reboot time metrics associated with the potential parent nodes and/or reboot time metrics associated with access points to which the potential parent nodes are connected. In such embodiments, a node receives, from a potential parent node that is an access point, a reboot time metric associated with the access point. The node also receives from a potential parent node that is not an access point (e.g., a BPD node) a reboot time metric associated with an access point to which the potential parent node is connected, either directly or indirectly. For example, a BPD node could identify a plurality of potential parent nodes, where one or more potential parent nodes are access points and one or more potential parent nodes are other BPD nodes.

Device Overviews

Figure 7:
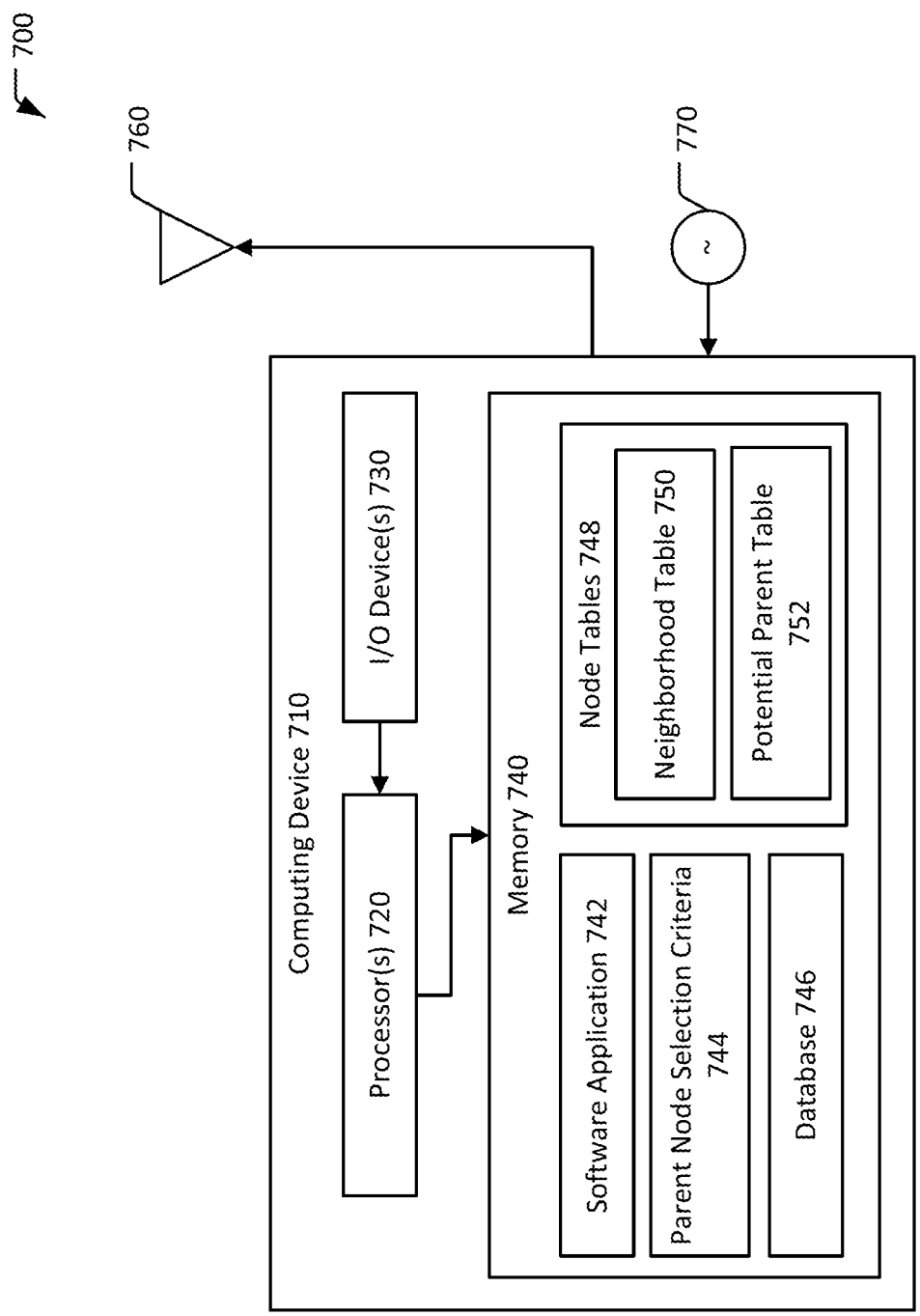
FIG. 7 illustrates an exemplary node device that can be included in a mesh network and configured to implement one or more aspects of various embodiments.

FIG. 7 illustrates an exemplary node device 700 that can be included in a mesh network and used to implement the techniques discussed above with respect to FIGS. 1-6. In some embodiments, node device 700 is consistent with any of BPDs 120. Node device 700 includes, without limitation, a computing device 710 coupled to a transceiver 760 and an oscillator 770. Computing device 710 coordinates the operations of the node device 700. Transceiver 760 is configured to transmit and receive message data packets across a network, such as mesh network 100, using a range of channels and power levels. In some embodiments, transceiver 760 includes one or more radios implemented in hardware and/or software to provide two-way RF communications with other nodes in the network via one or more communications links. In some embodiments, transceiver 760 can also, or instead, include a cellular modem that is used to transmit and receive data with a cellular base station via a corresponding link. Oscillator 770 provides one or more oscillation signals according to which the transmission and reception of message data packets can be scheduled. Each node device 700 can further include various analog-to-digital (A/D) and digital-to-analog (D/A) converters, digital signal processors (DSPs), harmonic oscillators, transceivers, and any other components generally associated with RF-based communication hardware (not shown).

The computing device 710 of node device 700 includes hardware configured to perform processing operations and execute program code. As shown, computing device 710 includes one or more processors 720, one or more input/output (I/O) devices 730, and memory 740, coupled together. The one or more processors 720 can include any hardware configured to process data and execute software applications. In general, the one or more processors 720 retrieve and execute programming instructions stored in the memory 740. I/O devices 730 include devices configured to both receive input and provide output.

The one or more processors 720 can be any technically feasible processing device configured to process data and execute program instructions. For example, the one or more processors 720 could include one or more central processing units (CPUs), DSPs, graphics processing units (GPUs), application-specific integrated circuits (ASICs), field-programmable gate arrays (FPGAs), microprocessors, microcontrollers, other types of processing units, and/or a combination of different processing units. In some embodiments, the one or more processors are coupled to a real-time clock (RTC) (not shown), according to which the one or more processors maintain an estimate of the current time.

Memory 740 includes one or more units that store data and/or program instructions. Memory 740 can be implemented by any technically feasible storage medium. For example, memory 740 could include a random-access memory (RAM) module, a flash memory unit, and/or other type of memory unit. The one or more processors 720, transceiver 760, and/or other components of node device 700 include functionality to read data from and/or write data to memory 740. As shown, memory 740 stores a software application 742, potential parent node selection criteria 744, database 746, and one or more node tables 748.

The software application 742 includes program instructions that, when executed by the one or more processors 720, performs any one or more of the computer-based techniques described herein including any of the techniques performed by a BPD 120 described in FIGS. 1, 2, 5, and/or 6. In some embodiments, the software application 742 can interface with the transceiver 760 to coordinate the transmission and reception of message data packets and/or periodic beacons across a network based on timing signals generated by the oscillator 770.

In some embodiments, node device 700 uses the software application 742 to connect to and communicate with other nodes in a network, such as mesh network 100. When joining the network, the node device 700 uses the software application 742 to perform a discovery process with one or more nearby nodes. For example, the node device 700 could use the software application 742 to discover nearby potential parent nodes and select a parent node from one or more nearby potential parent nodes.

In some embodiments, software application 742 is configured to determine reboot time metrics associated with one or more potential parent nodes. Software application 742 selects a parent node from the one or more potential parent nodes based on the reboot time metrics associated with the one or more potential nodes. Additionally, in some embodiments, software application 742 is configured to determine message success rates associated with the connections between node device 700 and the one or more potential parent nodes or other nodes. In such embodiments, software application 742 selects the parent node from the one or more potential parent nodes based on the associated message success rates in addition to the associated reboot time metrics.

In some embodiments, software application 742 is configured to periodically evaluate the quality of an established connection to a nearby node (e.g., an access point or another node 700) by determining message success rates and/or reboot time metrics associated with the established connection to the parent node. Software application 742 is configured to determine whether to modify the connection (e.g., select a different parent node) based on the message success rates and/or reboot time metrics. For example, software application 742 could be configured to select a new parent node if a message success rate and/or reboot time metric associated with a current parent node falls below a threshold value. If software application 742 determines that a different parent node should be selected, then software application 742 is configured to perform operations to select a different parent node, such as scanning for nearby parent nodes, requesting and/or receiving associated reboot time metrics, and selecting a parent node from potential parent nodes.

Parent node selection criteria 744 includes one or more sets of criteria that software application 742 uses to determine a specific parent node to select. In some embodiments, the parent node selection criteria 744 includes a hierarchy of distinct criterion, where each criterion is associated with a specific metric or set of metrics. Software application 742 uses each criterion in the hierarchy in a multi-step filtering process in order to identify, from a set of potential parent nodes, a specific parent node to connect to. In some embodiments, the parent node selection criteria 744 includes one or more criterion for selecting and/or filter potential parent nodes based on reboot time metrics, such as a preferred reboot time metric value, a minimum reboot time metric value, and/or the like.

In some embodiments, software application 742 produces and/or maintains one or more node tables 748, in order to assist in the managing of connections to other nodes in the network. In some embodiments, software application 742 adds, removes, and/or updates entries that are included in a given node table 748 in order to manage communications with one or more nodes in the network. In some embodiments, software application 742 stores node information associated with the other nodes in the network, for example and without limitation, a node identifier, MAC address, hop count from the node to the other node, hop count from the other node to an access point, average RSSI value, LSI value, message success rate(s), access point reboot time metric(s), and/or the like. In some embodiments, software application 742 stores success rate information that is used to compute the one or more message success rates, such as and without limitation, a number of attempts to receive messages, a number of messages received, neighbor success rate information, neighbor message success rates, and/or the like.

In some embodiments, the one or more node tables include a neighborhood table (NHT) 750 for storing information associated with neighboring nodes of node device 700, such as one or more parent nodes of node device 700 and/or one or more child nodes of node device 700. Software application 742 generates an entry in NHT 750 for each neighboring node. In some embodiments, the one or more node tables include a potential parent node table 752 for storing information associated with potential access points of node device 700. Software application 742 generates an entry in potential parent node table 752 for each node that software application 742 determines is within a threshold range of node device 700. For example, software application 742 may cause node device 700 to transmit one or more discovery messages and generate an entry in potential parent node table 752 for each node for which a discovery response message was received within a threshold time period.

Database 746 includes various data and data structures retrieved by and/or stored by the software application 742. For example, database 746 could include node data (e.g., security keys, media access control (MAC) addresses of neighboring node devices, quality metrics, etc.) and/or network data (e.g., network performance metrics, cost metrics, etc.). In various embodiments, the one or more node tables 748 (e.g., neighborhood table 750 and/or potential parent node table 752) are stored in the database 746.

Figure 8:
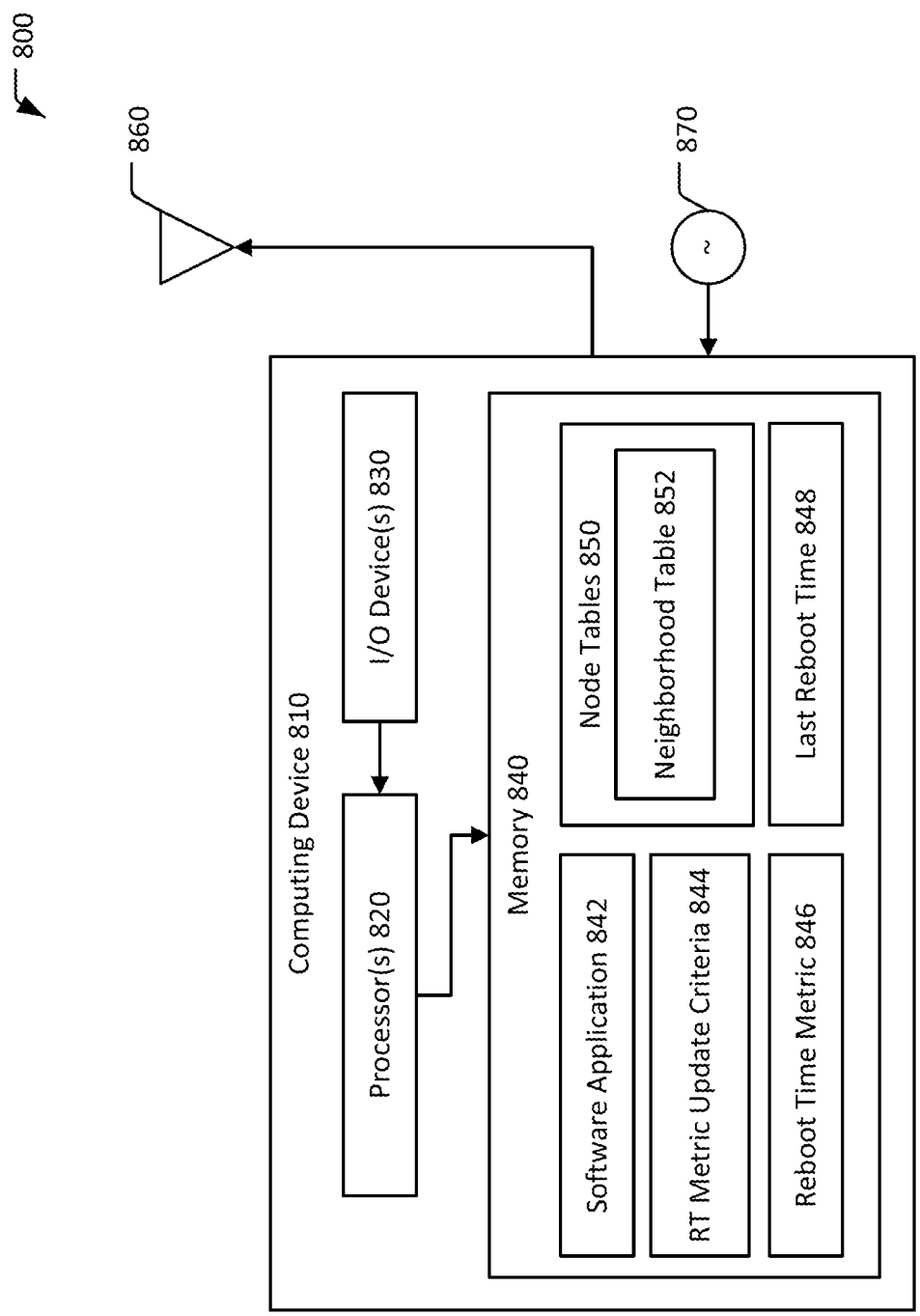
FIG. 8 illustrates another exemplary node device that can be included in a mesh network and configured to implement one or more aspects of various embodiments.

FIG. 8 illustrates an exemplary node device 800 that can be included in a mesh network and used to implement the techniques discussed above with respect to FIGS. 1-6. In some embodiments, node device 800 is consistent with any of access points 110. Node device 800 includes, without limitation, a computing device 810 coupled to a transceiver 860 and an oscillator 870. Computing device 810 coordinates the operations of the node device 800. Transceiver 860 is configured to transmit and receive message data packets across a network, such as mesh network 100, using a range of channels and power levels. In some embodiments, transceiver 860 includes one or more radios implemented in hardware and/or software to provide two-way RF communications with other nodes in the network via one or more communications links. In some embodiments, transceiver 860 can also, or instead, include a cellular modem that is used to transmit and receive data with a cellular base station via a corresponding link. Oscillator 870 provides one or more oscillation signals according to which the transmission and reception of message data packets can be scheduled. Each node device 800 can further include various analog-to-digital (A/D) and digital-to-analog (D/A) converters, digital signal processors (DSPs), harmonic oscillators, transceivers, and any other components generally associated with RF-based communication hardware (not shown).

The computing device 810 of node device 800 includes hardware configured to perform processing operations and execute program code. As shown, computing device 810 includes one or more processors 820, one or more input/output (I/O) devices 830, and memory 840, coupled together. The one or more processors 820 may include any hardware configured to process data and execute software applications. In general, the one or more processors 820 retrieve and execute programming instructions stored in the memory 840. I/O devices 830 include devices configured to both receive input and provide output.

The one or more processors 820 can be any technically feasible processing device configured to process data and execute program instructions. For example, the one or more processors 820 could include one or more central processing units (CPUs), DSPs, graphics processing units (GPUs), application-specific integrated circuits (ASICs), field-programmable gate arrays (FPGAs), microprocessors, microcontrollers, other types of processing units, and/or a combination of different processing units. In some embodiments, the one or more processors are coupled to a real-time clock (RTC) (not shown), according to which the one or more processors maintain an estimate of the current time.

Memory 840 includes one or more units that store data and/or program instructions. Memory 840 can be implemented by any technically feasible storage medium. For example, memory 840 could include a random-access memory (RAM) module, a flash memory unit, and/or other type of memory unit. The one or more processors 820, transceiver 860, and/or other components of node device 800 include functionality to read data from and/or write data to memory 840. As shown, memory 840 stores a software application 842, reboot time (RT) metric update criteria 844, reboot time metric 846, last reboot time 848, and one or more node tables 850.

The software application 842 includes program instructions that, when executed by the one or more processors 820, performs any one or more of the computer-based techniques described herein including any of the techniques performed by an access point 110 described in FIGS. 1-4. In some embodiments, the software application 842 can interface with the transceiver 860 to coordinate the transmission and reception of message data packets and/or periodic beacons across a network based on timing signals generated by the oscillator 870. In some embodiments, node device 800 uses the software application 842 to connect to and communicate with other nodes in a network, such as mesh network 100.

In some embodiments, software application 842 is configured to detect when the node device 800 and update reboot time metric 846 based on a current time and the last reboot time 848. Additionally, in some embodiments, software application 842 is configured to periodically determine whether to update reboot time metric 846 and update reboot time metric 846 in response to determining that reboot time metric 846 should be updated.

Reboot time metric update criteria 844 includes one or more sets of criteria and/or parameters that software application 842 uses to determine whether to update reboot time metric 846. For example, reboot time metric update criteria 844 could include a minimum (threshold) amount of time between reboot events, an amount of time between periodic updates, and/or the like. Additionally, reboot time metric update criteria 844 includes parameters for updating reboot time metric 846, such as a maximum time between reboot events, one or more weighing factors, a default reboot time metric value, and/or the like.

In some embodiments, software application 842 produces and/or maintains one or more node tables 850, in order to assist in the managing of connections to other nodes in the network. In some embodiments, software application 842 adds, removes, and/or updates entries that are included in a given node table 850 in order to manage communications with one or more nodes in the network. In some embodiments, software application 842 stores node information associated with the other nodes in the network, for example and without limitation, a node identifier, MAC address, hop count from the node to the other node, hop count from the other node to an access point, average RSSI value, LSI value, message success rate(s), access point reboot time metric(s), and/or the like. In some embodiments, software application 842 stores success rate information that is used to compute the one or more message success rates, such as and without limitation, a number of attempts to receive messages, a number of messages received, neighbor success rate information, neighbor message success rates, and/or the like. In some embodiments, the one or more node tables include a neighborhood table (NHT) 852 for storing information associated with neighboring nodes of node device 800, such as one or more parent nodes of node device 800 and/or one or more child nodes of node device 800. Software application 842 generates an entry in NHT 852 for each neighboring node.

System Overview

Figure 9:
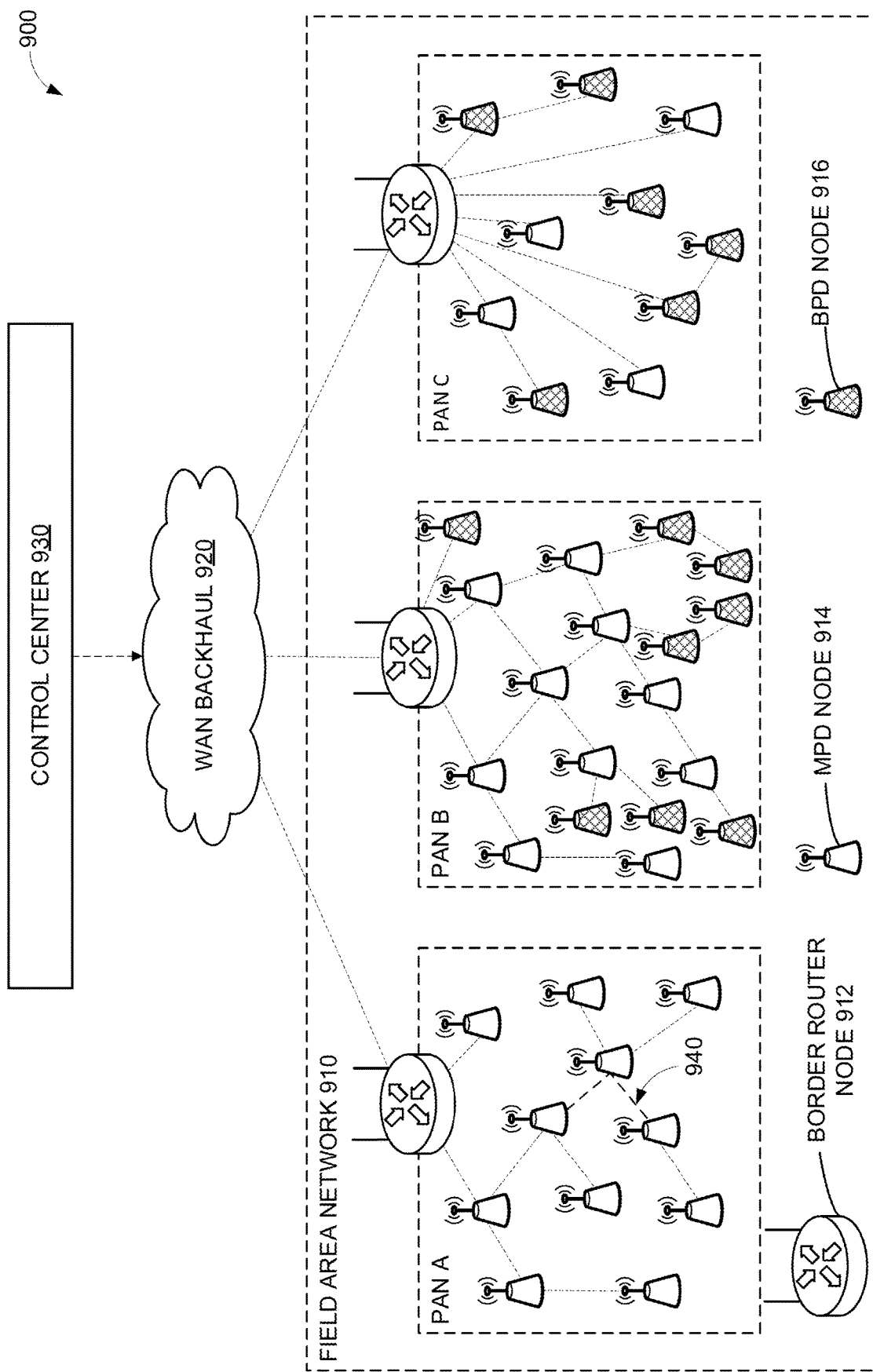
FIG. 9 illustrates a network system configured to implement one or more aspects of the present embodiments.

FIG. 9 illustrates a network system configured to implement one or more aspects of the present embodiments. As shown, network system 900 includes a field area network (FAN) 910, a wide area network (WAN) backhaul 920, and a control center 930. FAN 910 is coupled to control center 930 via WAN backhaul 920. Control center 930 is configured to coordinate the operation of FAN 910.

FAN 910 includes personal area network (PANs) A, B, and C. PANs A and B are organized according to a mesh network topology, while PAN C is organized according to a star network topology. Each of PANs A, B, and C includes at least one access point or border router node 912 and one or more mains-powered device (MPD) nodes 914. PANs B and C further include one or more battery-powered device (BPD) nodes 916. Any of border router node 912, the one or more MPD nodes 914, or the BPD nodes 916 can be used to implement the techniques discussed above with respect to FIGS. 1-7. In various embodiments, nodes 120 are implemented as any of nodes 914 and access points 110 are implemented as any of nodes 912 and/or nodes 914. Further, node device 700 shown in FIG. 7 can be implemented in FAN 910 as any of nodes and/or 916 and node device 800 shown in FIG. 8 can be implemented in FAN 910 as any of nodes 912 and/or 914.

MPD nodes 914 draw power from an external power source, such as mains electricity or a power grid. MPD nodes 914 typically operate on a continuous basis without powering down for extended periods of time. BPD nodes 916 draw power from an internal power source, such as a battery. BPD nodes 916 typically operate intermittently and power down, go to very low power mode, for extended periods of time in order to conserve battery power.

MPD nodes 914 and BPD nodes 916 are coupled to, or included within, a utility distribution infrastructure (not shown) that distributes a resource to consumers. MPD nodes 914 and BPD nodes 916 gather sensor data related to the distribution of the resource, process the sensor data, and communicate processing results and other information to control center 930. Border router nodes 912 operate as access points to provide MPD nodes 914 and BPD nodes 916 with access to control center 930.

Any of border router nodes 912, MPD nodes 914, and BPD nodes 916 are configured to communicate directly with one or more adjacent nodes via bi-directional communication links 940. The communication links 940 may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN can implement a discovery protocol to identify one or more adjacent nodes or "neighbors." A node that has identified an adjacent, neighboring node can establish a bi-directional communication link 940 with the neighboring node. Each neighboring node may update a respective neighbor table to include information concerning the other node, including the MAC address of the other node as well as a received signal strength indication (RSSI) of the communication link 940 established with that node.

Nodes can compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node can generate a data packet and then transmit the data packet to a destination node via any number of intermediate nodes (in mesh network topologies). The data packet can indicate a destination for the packet and/or a particular sequence of intermediate nodes to traverse in order to reach the destination node. In one embodiment, each intermediate node can include a forwarding database indicating various network routes and cost metrics associated with each route.

Nodes can transmit data packets across a given PAN and across WAN backhaul 920 to control center 930. Similarly, control center 930 can transmit data packets across WAN backhaul 920 and across any given PAN to a particular node included therein. As a general matter, numerous routes can exist which traverse any of PANS A, B, and C and include any number of intermediate nodes, thereby allowing any given node or other component within network system 900 to communicate with any other node or component included therein. Further, in various embodiments, each node in FAN 910 can perform key management and key mismatch resolution for a key stored at the node.

Control center 930 includes one or more server machines (not shown) configured to operate as sources for, or destinations of, data packets that traverse within network system 900. The server machines can query nodes within network system 900 to obtain various data, including raw or processed sensor data, power consumption data, node/network throughput data, status information, and so forth. The server machines can also transmit commands and/or program instructions to any node within network system 900 to cause those nodes to perform various operations.

1. According to some embodiments, a method comprises detecting, by an access point, that the access point has obtained network connectivity after a first reboot event; in response to detecting that the access point has obtained network connectivity after the first reboot event: determining, by the access point, a first amount of time between a first reboot time associated with the first reboot event and a second reboot time associated with a second reboot event that occurred prior to the first reboot event; updating, by the access point, a reboot time metric associated with the access point based on the first amount of time; and transmitting, by the access point, the reboot time metric to one or more nodes of a mesh network.
2. The method according to clause 1, wherein the first reboot time corresponds to a time at which the access point obtained the network connectivity.
3. The method according to clause 1 or clause 2, wherein the first reboot time corresponds to a time at which the access point received a coordinated universal time (UTC).
4. The method according to any of clauses 1-3, further comprising determining, by the access point, that the first amount of time exceeds a threshold amount of time before updating the reboot time metric.
5. The method according to any of clauses 1-4, further comprising limiting, by the access point, the first amount of time to a maximum amount of time between reboot events.
6. The method according to any of clauses 1-5, wherein the reboot time metric is an average amount of time between reboot events.
7. The method according to any of clauses 1-6, further comprising detecting, by the access point, that the access point has obtained network connectivity after a third reboot event; in response to detecting that the access point has obtained network connectivity after the third reboot event: determining, by the access point, a second amount of time between the first reboot time and a third reboot time associated with the third reboot event; determining that the second amount of time does not exceed a threshold amount of time; and in response to determining that the second amount of time does not exceed the threshold amount of time, determining that the reboot time metric should not be updated.
8. The method according to any of clauses 1-7, further comprising detecting, by the access point, that an update timer has expired; in response to detecting that the update timer has expired, determining whether the reboot time metric should be updated; and in response to determining that the reboot time metric should be updated, updating the reboot time metric based on a second amount of time between a current time and the first reboot time.
9. The method according to any of clauses 1-8, wherein determining that the reboot time metric should be updated comprises determining that the second amount of time is greater than the reboot time metric.
10. According to some embodiments, one or more non-transitory computer-readable media storing instructions which, when executed by one or more processors of an access point, cause the one or more processors to perform operations comprising determining a first amount of time between a first time associated with a current reboot of the access point and a second time associated with a last reboot of the access point; computing an aggregate reboot interval associated with the access point based on the first amount of time and a prior aggregate reboot interval associated and the access point; and transmitting the aggregate reboot interval to one or more nodes of a mesh network.
11. The one or more non-transitory computer-readable media according to clause 10, wherein the operations further comprise determining that the first amount of time is longer than a threshold amount of time before computing the aggregate reboot interval.
12. The one or more non-transitory computer-readable media according to clause 10 or clause 11, wherein computing the aggregate reboot interval comprises generating the aggregate reboot interval based on a difference between the prior aggregate reboot interval and the first amount of time.
13. The one or more non-transitory computer-readable media according to any of clauses 10-12, further comprising detecting, by the access point, that an update timer has expired; in response to detecting that the update timer has expired, determining that the aggregate reboot interval should be updated; and in response to determining that the aggregate reboot interval should be updated, recomputing the aggregate reboot interval based on a second amount of time between a current time and the first time.
14. The one or more non-transitory computer-readable media according to any of clauses 10-13, wherein determining that the aggregate reboot interval should be updated comprises determining that the second amount of time is greater than the aggregate reboot interval.
15. The one or more non-transitory computer-readable media according to any of clauses 10-14, wherein computing the aggregate reboot interval based on the first amount of time includes scaling the first amount of time using a first weighting factor, and wherein recomputing the aggregate reboot interval based on the second amount of time includes scaling the second amount of time using a second weighting factor different from the first weighting factor.

16. According to some embodiments, an access point comprises a transceiver, a processor, and a memory storing executable instructions that when executed by the processor cause the processor to perform operations comprising detecting that the access point has obtained network connectivity after rebooting; in response to detecting that the access point has obtained network connectivity after rebooting: determining a first amount of time between a first reboot time associated with the rebooting and a second reboot time associated with a previous rebooting; updating an average amount of time between reboots for the access point based on the first amount of time; and transmitting, using the transceiver, the average amount of time between reboots to one or more nodes of a mesh network.

17. The access point according to clause 16, wherein the operations further comprise transmitting the average amount of time between reboots to a first node of the mesh network in response to receiving a request for the average amount of time between reboots from the first node.

18. The access point according to clause 16 or clause 17, wherein the operations further comprise transmitting one or more quality metrics to the one or more nodes.

19. The access point according to any of clauses 16-18, wherein the operations further comprise determining, at a time after the rebooting, that the average amount of time between reboots should be updated and in response to determining that the average amount of time between reboots should be updated, updating the average amount of time between reboots based on an amount of time between a current time and the first reboot time.

20. The access point according to any of clauses 16-19, further comprising a persistent storage device, wherein the operations further comprise storing the average amount of time between reboots in the persistent storage device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   detecting, by an access point, that the access point has obtained network connectivity after a first reboot event;
   in response to detecting that the access point has obtained network connectivity after the first reboot event:
   determining, by the access point, a first amount of time between a first reboot time associated with the first reboot event and a second reboot time associated with a second reboot event that occurred prior to the first reboot event;
   updating, by the access point, a reboot time metric associated with the access point based on the first amount of time; and
   transmitting, by the access point, the reboot time metric to one or more nodes of a mesh network.

2. The method of claim 1, wherein the first reboot time corresponds to a time at which the access point obtained the network connectivity.

3. The method of claim 1, wherein the first reboot time corresponds to a time at which the access point received a coordinated universal time (UTC).

4. The method of claim 1, further comprising determining, by the access point, that the first amount of time exceeds a threshold amount of time before updating the reboot time metric.

5. The method of claim 1, further comprising limiting, by the access point, the first amount of time to a maximum amount of time between reboot events.

6. The method of claim 1, wherein the reboot time metric is an average amount of time between reboot events.

7. The method of claim 1, further comprising:
   detecting, by the access point, that the access point has obtained network connectivity after a third reboot event;
   in response to detecting that the access point has obtained network connectivity after the third reboot event:
   determining, by the access point, a second amount of time between the first reboot time and a third reboot time associated with the third reboot event;
   determining that the second amount of time does not exceed a threshold amount of time; and
   in response to determining that the second amount of time does not exceed the threshold amount of time, determining that the reboot time metric should not be updated.

8. The method of claim 1, further comprising:
   detecting, by the access point, that an update timer has expired;
   in response to detecting that the update timer has expired, determining whether the reboot time metric should be updated; and
   in response to determining that the reboot time metric should be updated, updating the reboot time metric based on a second amount of time between a current time and the first reboot time.

9. The method of claim 8, wherein determining that the reboot time metric should be updated comprises determining that the second amount of time is greater than the reboot time metric.

10. One or more non-transitory computer-readable media storing instructions which, when executed by one or more processors of an access point, cause the one or more processors to perform operations comprising:
    determining a first amount of time between a first time associated with a current reboot of the access point and a second time associated with a last reboot of the access point;
    computing an aggregate reboot interval associated with the access point based on the first amount of time and a prior aggregate reboot interval associated with the access point; and
    transmitting the aggregate reboot interval to one or more nodes of a mesh network.

11. The one or more non-transitory computer-readable media of claim 10, wherein the operations further comprise determining that the first amount of time is longer than a threshold amount of time before computing the aggregate reboot interval.

12. The one or more non-transitory computer-readable media of claim 10, wherein computing the aggregate reboot interval comprises generating the aggregate reboot interval based on a difference between the prior aggregate reboot interval and the first amount of time.

13. The one or more non-transitory computer-readable media of claim 10, further comprising:
    detecting, by the access point, that an update timer has expired;
    in response to detecting that the update timer has expired, determining that the aggregate reboot interval should be updated; and
    in response to determining that the aggregate reboot interval should be updated, recomputing the aggregate reboot interval based on a second amount of time between a current time and the first time.

14. The one or more non-transitory computer-readable media of claim 13, wherein determining that the aggregate reboot interval should be updated comprises determining that the second amount of time is greater than the aggregate reboot interval.

15. The one or more non-transitory computer-readable media of claim 13, wherein computing the aggregate reboot interval based on the first amount of time includes scaling the first amount of time using a first weighting factor, and wherein recomputing the aggregate reboot interval based on the second amount of time includes scaling the second amount of time using a second weighting factor different from the first weighting factor.

16. An access point comprising:
    a transceiver;
    a processor; and
    a memory storing executable instructions that when executed by the processor cause the processor to perform operations comprising:
    detecting that the access point has obtained network connectivity after rebooting;
    in response to detecting that the access point has obtained network connectivity after rebooting:
    determining a first amount of time between a first reboot time associated with the rebooting and a second reboot time associated with a previous rebooting;
    updating an average amount of time between reboots for the access point based on the first amount of time; and
    transmitting, using the transceiver, the average amount of time between reboots to one or more nodes of a mesh network.

17. The access point of claim 16, wherein the operations further comprise transmitting the average amount of time between reboots to a first node of the mesh network in response to receiving a request for the average amount of time between reboots from the first node.

18. The access point of claim 16, wherein the operations further comprise transmitting one or more quality metrics to the one or more nodes.

19. The access point of claim 18, wherein the operations further comprise:
- determining, at a time after the rebooting, that the average amount of time between reboots should be updated; and
- in response to determining that the average amount of time between reboots should be updated, updating the average amount of time between reboots based on an amount of time between a current time and the first reboot time.

20. The access point of claim 17, further comprising a persistent storage device, wherein the operations further comprise storing the average amount of time between reboots in the persistent storage device.

* * * * *